United States Patent [19]
Fissolo

[11] 3,958,024

[45] May 18, 1976

[54] PROCESS FOR THE PRODUCTION OF A CHOCOLATE SWEET CONTAINING AN INNER SUGAR CRUST

[76] Inventor: Maria Franca Fissolo, Via Malines 25, Savigliano (Cuneo), Italy

[22] Filed: June 20, 1973

[21] Appl. No.: 371,795

[30] Foreign Application Priority Data
June 22, 1972 Switzerland.......................... 9407/72

[52] U.S. Cl................................. 426/282; 426/93; 426/103; 426/631; 426/660
[51] Int. Cl.². ........................................... A23G 3/00
[58] Field of Search ........... 426/171, 103, 214, 213, 426/279, 280, 281, 282, 380, 631, 639, 660, 93; 99/134

[56] References Cited
UNITED STATES PATENTS

| | | | |
|---|---|---|---|
| 1,138,929 | 5/1915 | Boyd | 426/282 |
| 1,621,568 | 3/1927 | Vose | 426/380 X |
| 2,461,399 | 2/1949 | Strausser | 426/103 |
| 3,496,886 | 2/1970 | Fohr | 426/380 |
| 3,769,039 | 10/1973 | Kleinert | 426/282 |
| 3,795,748 | 3/1974 | Cillario | 426/282 |

FOREIGN PATENTS OR APPLICATIONS

| | | | |
|---|---|---|---|
| 1,172,417 | 11/1969 | United Kingdom | 99/134 |

*Primary Examiner*—S. Leon Bashore
*Assistant Examiner*—Arthur L. Corbin
*Attorney, Agent, or Firm*—Sughrue, Rothwell, Mion, Zinn and Macpeak

[57] ABSTRACT

To make a chocolate sweet with a liquid filling separated by a sugar crust from the chocolate, a quantity of an aqueous solution, which is unsaturated with sugar but contains a quantity of sugar so as to provide a saturation point at least as high as 30°C, is put into a chocolate shell at 0°C or colder and the curst forms in situ.

7 Claims, 3 Drawing Figures

PROCESS FOR THE PRODUCTION OF A CHOCOLATE SWEET CONTAINING AN INNER SUGAR CRUST

According to one aspect of the invention, there is provided a process for the production of a chocolate sweet comprising making an aqueous solution of sugar with flavoring and putting a quantity of the solution whilst it is above normal room temperature into a shell made of chocolate which is below 0°C, after which the solution cools in the shell and there is formed in the shell a crust of sugar separating the solution from the chocolate and such a crust remains when the whole of the sweet is at normal room temperature.

According to another aspect of the invention, there is provided a process for the production of a chocolate sweet comprising making an aqueous solution of sugar, with flavoring, with a sugar saturation temperature above 30°C, and putting a quantity of the solution into a shell made of chocolate whilst said quantity is above 20°C and the shell is below 0°C, after which the solution cools in the shell and there is formed in the shell a crust of sugar separating the solution from the chocolate and such a crust remains when the whole of the sweet is at 20°C.

Preferably the chocolate shell has a wall thickness of at least 1.5 mm. and a weight at least half of the weight of the quantity of solution which is put into it.

When the quantity of the solution is put into the shell, it is preferably unsaturated with sugar and above the temperature of incipient fusion of the chocolate. The solution may contain such a quantity of sugar that it has a saturation point at least as high as the point of incipient fusion of the chocolate.

The solution may be poured into the shell through a filling opening which is sealed with chocolate before the formation of the sugar crust.

According to a narrower aspect of the present invention, there is provided a process for the production of a chocolate having a liquid filling comprising:

a. making in a mold a shell of the chocolate having a wall thickness of at least 1.5 mm. and also having portions defining a filling opening, b. making an aqueous filling solution which is unsaturated with sugar but contains a quantity of sugar such as to afford a saturation point at least as high as the point of incipient fusion of the chocolate, c. cooling the shell whilst still in the mold and also the mold itself to at most 0°C, d. introducing into the shell by way of said filling opening whilst the shell and the mold are at most at 0°C a quantity of the solution whilst the latter is still unsaturated, said quantity having at most twice the weight of the shell, and e. sealing said filling opening with chocolate, whereby a crust of sugar subsequently forms in the shell, separating the solution from the chocolate.

At stage (d) the shell and the mold are preferably at a temperature no higher than −5°C; a temperature of −10°C seems to be particularly appropriate.

It is preferable for cooling of the shell and the mold to be effected after stage (d) and before stage (e), the cooling being controlled so that the temperature of the outer half of the thickness of the shell is at most at 30°C.

It is advantageous, after stage (d), for cooling to be effected of the free surface of the liquid and the closure chocolate to be applied after the temperature of this free surface has fallen to the range 25° to 35°C.

When the solution is introduced into the shell the temperature of the solution is preferably a little higher than the saturation temperature, say 5° to 10°C higher.

The solution may contain an alcoholic or a non-alcoholic flavoring, for example a Cognac, brandy or coffee flavoring.

The weight of the shell could be equal to the weight of the filling.

Examples in accordance with the invention are described below with reference to the accompanying drawing, in which.

Figure 1:
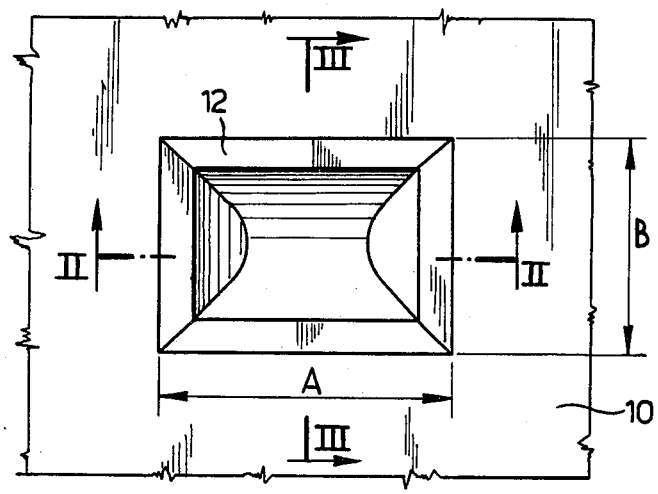
FIG. 1 shows a plan view of a preformed chocolate shell in a mold.

Referring to the drawing, reference numeral 10 designates a mold, for example a stainless steel mold, consisting of a slab of substantial weight in one face of which there are formed various rows of cavities (for example nine rows each having five cavities) in which chocolate shells are preformed in known manner. The drawing shows the zone of a single cavity with its shell 12 already preformed, having length A, width B, depth C and wall thickness D; it is difficult to keep the latter constant at all points on the shell 12, but deviations will not exceed, as a rule, 10% (more or less) relative to a mean value. The minimum value of the thickness D is preferably not less than 1.5 mm. An exception to this rule, in the geometrical form illustrated, is the flared filling opening 14 located between the lines 16 and 18, which is subsequently sealed with chocolate forming the base of the chocolate sweet.

The cavity 20 subjacent the line 18 is here called the "filling cavity" and its volume corresponds to the volume of the dose of sugar solution to be poured into the shell. The weight of the shell 12 is preferably at least half the weight of the said dose; thus, in order to satisfy this requirement, the thickness D of the shell may also be greater than 1.5 mm. As a rule, for a shell/dose weight ratio of the order of 1:1, the thickness of the shell will be between 2.5 and 3 mm. in all the most common forms of chocolates the weight of which is of the order of 10 – 15 g.

The mold 10 should advantageously have a large thermal capacity, so that it is able to accumulate a large quantity of "cold" (relative to the incipient melting point of the chocolate material, for which the value may be assumed to be 28°–30°C). The material of the mold should thus have high specific heat and/or the mass of the mold should be high. An ideal material should also have a high degree of thermal conductivity.

The sugar solution, with flavoring, preferably contains a quantity of sugar such as to afford a saturation point not lower than the incipient melting point of the chocolate; furthermore, at the instant of pouring into the shell, the solution is preferably in the unsaturated condition.

Figure 2:
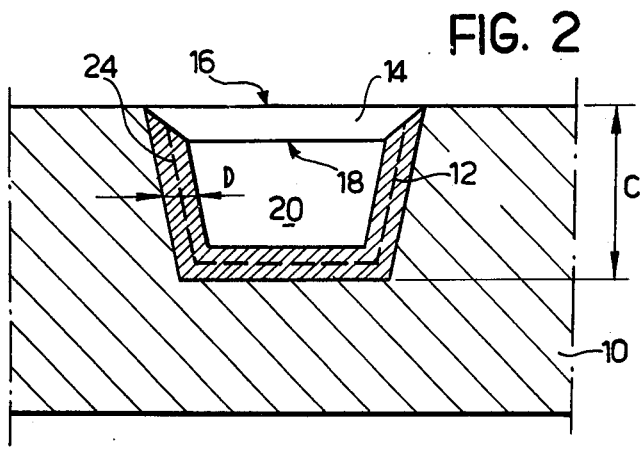
FIGS. 2 and 3 show cross-sections of the shell and mold, taken along the lines II—II and III—III of FIG. 1.

Once the quantity of solution has been poured into the shell 12, the solution cools due to the effect of the cold which has accumulated in the shell and in the mold. It is necessary, however, according to the invention, that the temperature of the shell should, on first contact being established with the solution, not be higher than 0°C, preferably not higher than −5°C; the preferred temperature is approximately −10°C. It would appear that, thereby, there is formed between the dose of solution and the chocolate material of the shell a thermal shield which protects the chocolate material of the shell against melting, despite the fact that, temperature of the solution at the instant of pouring might be between approximately 45°C and approximately 70°C. In some cases it may be necessary to supplement the action of the heat barrier by continuing, after pouring, the cooling of the shell and the mold, such cooling being controlled in such manner that the temperature of the external half of the thickness of the shell (i.e., of the portion located externally of the broken line 24 in FIG. 2) will not be higher than 28°–30°C. This may be achieved by disposing the mold 10 on a cooled metal plate. However, it is preferred to continue cooling in such manner that the cooling is applied also to the free surface of the liquid filling poured into the shell. In order to achieve this, it will suffice to dispose the mold in a cold-air tunnel. Preferably, the temperature of the cold air flowing through the tunnel will only be moderately low (typically 10°–15°C), in such manner as not to bring about the formation of a thermal shield also on the free surface of the filling.

When the temperature of the free surface has dropped to a value between 25°C and 35°C, the shell is closed by applying the base (or end face) of chocolate material in the zone 14, in per se known manner.

With the cooling of the solution enclosed in the chocolate, on the inner walls of the shell and on the base, crystalline sugar separates out and forms a sugar crust separating the liquid from the chocolate. In order to make formation of the crust more uniform, the chocolates can be turned upside down from time to time, in accordance with per se known technique.

EXAMPLE 1

There is prepared, in per se known manner, a sugar solution containing a non-alcoholic (coffee) flavoring, the solution having a sugar content such as to afford a sugar saturation point of 35°C. The temperature of the solution when ready for pouring is 45°C.

Figure 3:
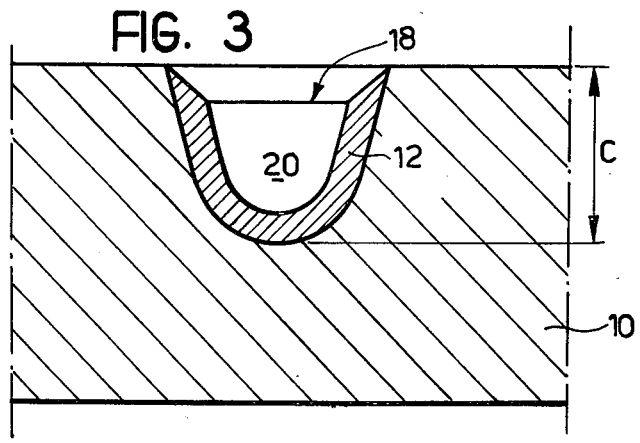

In a rectangular steel mold having 45 cavities, there are prepared 45 chocolate material shells with a fusion interval of 33°–35°C. The shells, which have substantially the shape illustrated in FIGS. 1–3, weigh on the average between 4.5 and 5 grams and have substantially the following dimensions:

A = 28 mm
B = 23 mm
C = 19 mm
D = 2.5 mm

The mold, with the shells, is cooled to −10°C, whereupon there is poured into each shell a dose of 5 grams of the solution at 45°C. After approximately 1 minute, there is formed in the filling opening 14, in per se known manner by spraying with chocolate material, the base or bottom of the chocolate which solidifies and hardens in the course of a few seconds. The excess of chocolate material employed for the spraying of the bases is removed from the surface of the mold, the chocolates obtained are extracted from the mold and introduced into boxes (right side up). After approximately 8 hours, the boxes are turned upside down; preferably, after a further 12–24 hours a second turning upside down is effected. At the end of 48 hours from pouring, the sugar crust is completely formed.

EXAMPLE 2

An alcoholic (Cognac) syrup is prepared in known manner, containing 15% by weight of alcohol and a quantity of sugar corresponding to a saturation point of approximately 60°C, dissolved in water. The temperature of the syrup ready for pouring is 70°C. The process is then continued as described in Example 1, up to pouring. Immediately after pouring (within approximately 30 sec.) the mold is transferred to a tunnel cooled with cold air at +10°C. After approximately 20 minutes in the tunnel, the bases are applied and the operations already discussed in Example 1 are effected.

I claim:

1. A process for the production of a chocolate sweet comprising making an aqueous solution of sugar, with flavoring, with a sugar saturation temperature above 30°C and putting a quantity of the solution into a shell made of chocolate while said quantity is above its saturation temperature and the shell is below 0°C, cooling the solution in the shell to form in the shell a crust of sugar separating the solution from the chocolate, said crust remaining when the whole of the sweet is at 20°C.

2. A process according to claim 1 in which the chocolate shell has a wall thickness of at least 1.5 mm. and the weight of the shell is at least half of the weight of the quantity of solution put into it.

3. A process for the production of a chocolate having a liquid filling comprising:
  a. making in a mold a shell of the chocolate having a wall thickness of at least 1.5 mm. and also having portions defining a filling opening,
  b. making a hot aqueous filling solution which is unsaturated with sugar but contains a quantity of sugar such as to afford a saturation point at least as high as 30°C,
  c. cooling the shell while still in the mold and also the mold itself to no higher than 0°C,
  d. introducing into the shell by way of said filling opening while the shell and the mold are no higher than at 0°C a quantity of the solution while the latter is still unsaturated, said quantity having at most twice the weight of the shell, and
  e. sealing said filling opening with chocolate, whereby a crust of sugar subsequently forms in the shell separating the solution from the chocolate.

4. A process according to claim 3 in which in stage (d) the shell and the mold are no higher than −5°C.

5. A process according to claim 3 in which in stage (d) the shell and the mold are at −10°C.

6. A process according to claim 3 in which cooling of the shell and the mold is effected after the stage (d) and before stage (e), the cooling being controlled so that the temperature of the outer half of the thickness of the shell is no higher than 30°C.

7. A process according to claim 3 in which after stage (d) cooling is effected of the free surface of the liquid and the chocolate for sealing said opening in stage (e) is supplied after the temperature of the free surface has fallen to the range 25°C to 35°C.

* * * * *